United States Patent
Lee et al.

(10) Patent No.: US 6,611,893 B1
(45) Date of Patent: Aug. 26, 2003

(54) DATA BUS METHOD AND APPARATUS PROVIDING VARIABLE DATA RATES USING A SMART BUS ARBITER

(75) Inventors: Hyun Lee, Allentown, PA (US); David W. Potter, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/474,411

(22) Filed: Dec. 29, 1999

(51) Int. Cl.[7] .............................................. G06F 13/36
(52) U.S. Cl. ...................................................... 710/309
(58) Field of Search ............................... 710/305, 306, 710/309, 113, 119, 241, 242

(56) References Cited

U.S. PATENT DOCUMENTS

| | | | | |
|---|---|---|---|---|
| 4,419,724 A | * | 12/1983 | Branigin et al. | 710/108 |
| 4,533,994 A | * | 8/1985 | Harrill et al. | 710/40 |
| 4,727,491 A | * | 2/1988 | Culley | 703/23 |
| 5,111,424 A | * | 5/1992 | Donaldson et al. | 710/117 |
| 5,455,915 A | * | 10/1995 | Coke | 370/462 |
| 5,632,016 A | * | 5/1997 | Hoch et al. | 710/100 |
| 5,634,034 A | * | 5/1997 | Foster | 345/520 |
| 6,424,688 B1 | * | 7/2002 | Tan et al. | 375/354 |
| 6,434,684 B1 | * | 8/2002 | Manning | 365/233 |

* cited by examiner

*Primary Examiner*—Paul R. Myers
(74) *Attorney, Agent, or Firm*—Synnestvedt & Lechner LLP

(57) ABSTRACT

A method and apparatus for arbitrating access to a bus such that the bus can operate at a variable data rate, that rate being the rate of the slower of the two devices communicating over the bus. The smart arbiter in accordance with the invention has knowledge of the speed of the devices that use the bus and grants access in an order and at a rate based on that information. The smart arbiter can intersperse grants such that data transfers between multiple pairs of transmitting and receiving devices that are not independently utilizing the maximum bandwidth capabilities of the bus can overlap. Thus, if one pair of devices are exchanging multiple consecutive words (or other units of data) at a rate slower than the maximum rate of the bus, another pair of devices can use some of the bus clock cycles between the transfer of words of the first device pair, for transfers of words between the second device pair.

52 Claims, 5 Drawing Sheets

DATA BUS METHOD AND APPARATUS PROVIDING VARIABLE DATA RATES USING A SMART BUS ARBITER

FIELD OF THE INVENTION

The invention pertains to electronic busses. More particularly, the invention pertains to arbitration of access to an electronic bus.

BACKGROUND OF THE INVENTION

The use of busses (e.g., address busses and data busses) to provide a single data path that is shared by a plurality of data processing devices, such as memories, microprocessors, micro controllers, digital signal processors (DSPs), and peripheral devices is, of course, well known. Busses are most commonly formed on printed circuit boards (PCBs) and interconnect a plurality of devices, for example, integrated circuits, mounted on the PCB. The busses may also run out to connectors, such as on a backplane of a personal computer, in order to allow peripheral devices to be coupled to the bus.

Busses on PCBs commonly are subject to substantial noise. Particularly, a bus is essentially a long metal wire which can be subject to a significant amount of capacitive coupling with other devices mounted or imprinted on the PCB.

Recently, integrated circuit manufacturers have begun producing single chips containing multiple device cores of the type, e.g., memories, micro controllers, DSPs, and microprocessors, that traditionally were embodied on different chips mounted on a PCB and interconnected by one or more busses that ran on the PCB. Such a chip is commonly termed a system-on-a-chip or SoC.

SoCs also frequently incorporate busses to provide data paths to interconnect the multiple core devices (sometimes called macro blocks or macros) on the chip. The busses on SoCs, however, comprise conductor traces on the chip and thus tend to be much shorter in length and less sensitive to noise than PCB busses. A typical SoC that would include one or more busses might be a SoC including a processor or multiprocessor that connects to several peripheral devices and/or several memory blocks (SRAM, DRAM, PROM and ROM).

Conventional busses on PCBs are usually quite long. Therefore, the data speed on such busses, i.e., the bus bandwidth, is limited as a function of the bus length. Specifically, the data rate on the bus cannot be made faster than the maximum amount of time it would take for data to travel from one end of the bus to the opposite end plus the maximum possible delay from enablement to data acquisition and the receive latch time. The speeds of data processing devices and memories have become so fast that the bus length is now commonly the bandwidth limiting factor for data transfer rates over PCB busses. For instance, microprocessors now commonly operate at speeds of 500 MHz and higher. However, the time for a signal to travel from one end of a PCB to another, e.g., 5 inches, might be on the order of 10 nanoseconds ($10 \times 10^{-9}$ seconds). Accordingly, the bus bandwidth of such a bus would need to be limited to no greater than 100 MHz ($1/(10 \times 10^{-9}$ seconds).

Busses that solely interconnect core devices on a SoC are much shorter in length and are not nearly as sensitive to noise as PCB busses. Accordingly, data transfer rates over SoC busses typically are not limited by the bus length, but by the speed of the core devices. Thus, the bus speed on a SoC commonly is limited to the data transfer speed of the slowest device coupled to the bus.

SUMMARY OF THE INVENTION

The invention is a method and apparatus for arbitrating access to a bus such that the bus can operate at a variable data rate and all data transfers over the bus require just one dedicated high speed bus clock cycle regardless of the speeds of the two devices (transmitter and receiver) involved in the transaction. Since only one dedicated bus clock cycle is used per transfer, the invention allows multiple device pairs to intersperse data transactions over the bus. Specifically, if no single device pair is capable of transferring data utilizing the full speed of the bus, one device pair can actively drive the bus during cycles that are not dedicated to transfers between another device pair, but that occur while the other device pair(s) is setting up its data for the bus.

The smart arbiter in accordance with the present invention has knowledge of the clock speeds and phases of the rot clocks of all of the devices that use the bus and grants accesses, issues bus grants and enables the corresponding output buffers at times based on that information in order to utilize only a single dedicated bus cycle per each transaction and to most efficiently utilize the bandwidth of the bus. The smart arbiter can intersperse grants such that data transfers between multiple pairs of transmitting and receiving devices that are not individually utilizing the maximum bandwidth capabilities of the bus can overlap. Thus, if one pair of devices is exchanging multiple words (or other units of data) at a rate slower than the maximum rate of the bus, another pair of devices can use some of the bus clock cycles between the transfer of words of the first device pair, for transfers of words between the second device pair.

DETAILED DESCRIPTION OF THE INVENTION

Figure 1:
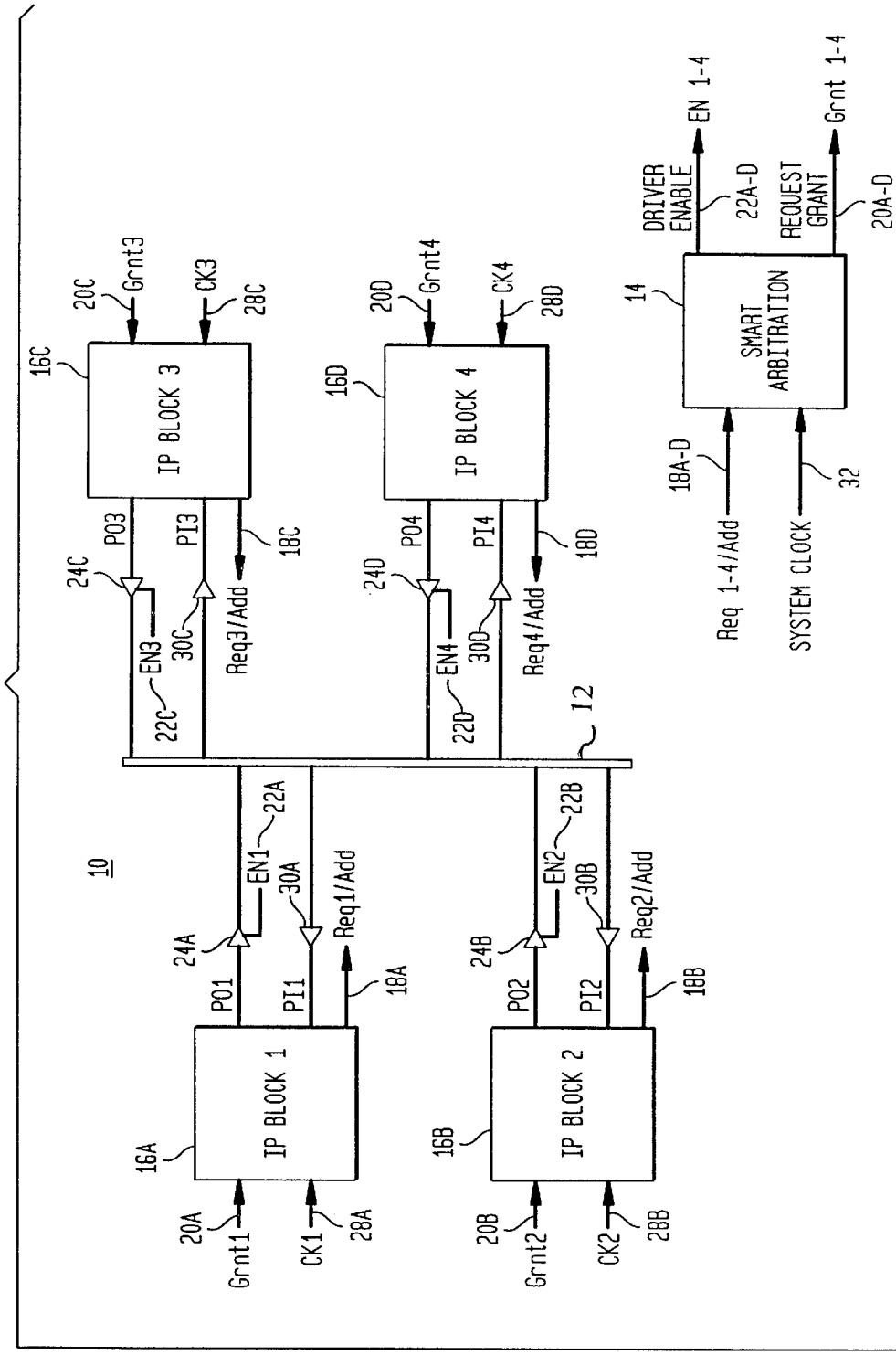
FIG. 1 is a block diagram of a system-on-a-chip integrated circuit incorporating a smart bus arbiter in accordance with the present invention.

FIG. 1 is a block diagram illustrating an exemplary system-on-a-chip integrated circuit 10 employing a bus 12 and using a smart arbiter circuit 14 in accordance with the present invention. As illustrated, the integrated circuit 10 comprises a plurality of core devices (or macro blocks) 16A, 16B, 16C, 16D, such as microprocessors, micro controllers, and memories. The integrated circuit further comprises a bus 12 over which the core devices can exchange data. For simplicity, we shall assume that the bus width is 16 bits (one word). The IC further includes a smart arbiter 14 that receives requests for access to the bus over request control lines 18A–18D from each of the core devices 16A–16D and returns request GRANTS via control lines 20A–20D to the requesting blocks.

The smart arbiter 14 also issues separate driver ENABLE signals over control lines 22A–22D responsive to bus access requests. Each core device 16A–16D is coupled to output data onto the bus through a driver circuit comprising a tristate output buffer 24A–24D. The aforementioned driver ENABLE signals generated by the smart arbiter 14 are coupled to the tristate control terminal of the buffers 24A–24D.

The smart arbiter 14 can be constructed from any circuitry that can be designed to provide the functions set forth herein, such as, but not limited to, logic gates, a micro processor, a micro controller, a state machine, a look up table in memory or any combination of the above.

Each core device has an input buffer 30A–30D coupled between it and the bus for latching data sent to it via the bus from another core device (or peripheral device).

As is typical of SoC ICs, each core device operates at a clock speed independent of the clock speed of the other core devices. Accordingly, each device might operate based on a different clock 28A–28D. In order to simplify the discussion of the invention, in the exemplary embodiments discussed herein, we shall assume that clock 28A of core device 16A operates at the fastest clock speed of any core device on the IC, that clock 28B operates at one half the rate of clock 28A, that clock 28C of device 16C operates at one third the rate of clock 28A, and that clock 28D operates at one quarter the rate of clock 28A.

In order to best illustrate the advantages of the present invention, we shall also assume that the bus clock 32 operates at the speed of the fastest core device clock 28A. This is easily achieved on a system on a chip integrated circuit, for instance, where the busses have such short propagation delay that the bus clock speed can easily exceed the speed of the fastest core device on the chip.

The arbiter 14 grants bus accesses on a single bus clock cycle basis. Accordingly, if a device needs access to the bus to transfer multiple words of data, it must issue a separate request for each word. Also, regardless of the speed of the transmitting and receiving devices, each word transfer utilizes just one dedicated bus clock cycle during which the data from the transmitting core device is asserted on the bus. This allows the arbiter 14 to intersperse grants to different core devices 16 with simultaneously pending requests so as to maximize utilization of the bus bandwidth.

The smart arbiter 14 can provide this type of operation because it has knowledge of the speed and phase of the clock of each of the core devices that utilizes the bus, such as by storing that information in a look up table.

When a core device requests access to the bus, the request includes not only the request for access, but also the identity of the requesting (or source) device and the destination device so that the smart arbiter 14 can determine the speed and phase of their clocks.

In accordance with the invention, access to the bus can be interspersed among simultaneously requesting devices so as to maximize use of the bus bandwidth when no single pair of transmitting/receiving devices can utilize the full bandwidth of the bus. For instance, if the faster of the transmitting and receiving devices involved in a first transaction over the bus runs at one-quarter the bus clock speed and multiple words are to be transferred there between, then, at best, one word can be transferred every four bus clock cycles. If multiple device pairs have simultaneously pending bus access requests, the smart arbiter 14 of the present invention arranges multiple data transactions between multiple pairs of transmitting/receiving device pairs such that, rather than wasting three out of every four bus clock cycles, the intermediate clock cycles which are not dedicated to the transaction between the first pair of transmitting/receiving devices can be used by other transmit/receive device pairs.

The invention exploits the fact that the delay time from enabling a bus driver 24 to the data becoming valid on the bus (hereinafter the data acquisition time, $T_a$) for some busses and particularly SoC busses is much less than a half clock period of the fastest core device on the chip. Thus, the bus clock rate can be set to at least the rate of the fastest core device. Specifically, even the fastest core devices in a system-on-a-chip integrated circuit usually have many combinatorial logic gates in the signal path from one clocked element to the next clocked element. However, for short busses, the bus data transfer delay path from the transmitting device to the receiving device usually comprises the circuit delays of only the output buffer 24 of the transmitting device and the input latch 30 of the receiving device. Accordingly, for short busses such as are found on a SoC, the bus delay period for a bus data transaction should easily be less than a half clock cycle of the fastest core device. Given that data is available on the bus within a half bus clock cycle of a core device being granted access to the bus, the data can easily be latched at the receiving core device by the end of the second phase of the same bus clock cycle, i.e., by the leading edge of the next bus clock cycle. Accordingly, the bus clock can be set to at least the rate of the fastest core device.

By intelligently controlling the timing of issuing GRANT and ENABLE control signals to the core devices in accordance with the invention, the smart arbiter 14 can assure that all bus data transactions require only one dedicated bus clock cycle regardless of the clock rate of the core devices involved in the transaction.

The clock speeds of the various core devices need not be synchronized to each other. However, the smart arbiter 14 should be able to determine the clock phase of any core device at any given instant in order to intelligently issue GRANT and ENABLE control signals. By interspersing access to the bus between multiple requesting devices as mentioned above, overall bus data transactions can be accomplished at rates at least as fast as the fastest core device.

FIGS. 2–5 illustrate various examples of bus access timing in accordance with the present invention. Although the invention is readily adaptable to many different clocking schemes, let us assume for exemplary purposes that all bus transaction events are leading edge triggered. Thus, any source device can commence generating valid data for the bus responsive to the leading edge of its clock. Further, any destination device latches data on the bus responsive to the leading edge of its clock.

In accordance with the invention, the smart arbiter 14 grants accesses to the bus using two control signals, namely, GRANT 20 and ENABLE 22. GRANT tells the corresponding core device 16 to start generating the data at the input of its corresponding tristate output buffer 24. ENABLE separately enables the tristate output buffer 24 to actually place the data on the bus 12.

The smart arbiter 14 assures that all bus transactions consume only one dedicated bus clock cycle by issuing ENABLES only during the bus clock cycle immediately preceding a leading edge of the destination device's clock.

That way, the destination device will latch the data at the leading edge of the bus clock cycle immediately following the bus clock cycle in which it was placed on the bus.

Further, the smart arbiter must issue the corresponding GRANT control signal before it issues the ENABLE control signal. More specifically, the smart arbiter 14 must issue the corresponding GRANT 20 to the source device at least as early as the bus clock cycle immediately preceding the most recent leading edge of the clock of the source device that is prior to the corresponding ENABLE. The reason for this condition should be apparent. The data must be at the input of the tristate buffer 24 before it is enabled and it can only be made available responsive to a leading edge of the source device's clock.

Figure 2:
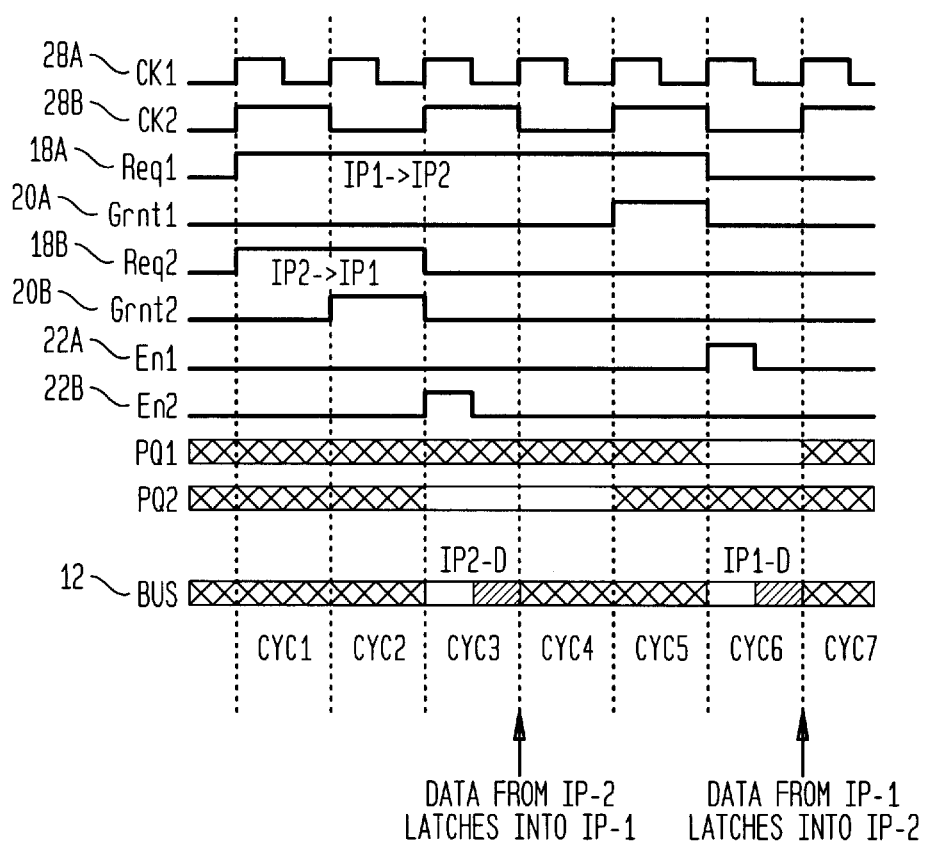
FIG. 2 is a timing diagram illustrating operation of the circuit of FIG. 1 in accordance with the present invention for a first set of bus access request conditions.

FIG. 2 illustrates a first example of bus access timing in accordance with the present invention in which two core devices, 16A and 16B, request access to the bus simultaneously. Core device 16A is clocked by clock 28A which has the same period as the bus clock. Core device 16B is clocked by clock 28B which operates at half the speed (or alternately, twice the cycle period) of clock 1.

In clock cycle 1, core device 16A and core device 16B simultaneously issue requests for access to the bus. The requests include the identity of the source and destination devices. Specifically, core device 16A is sending data to core device 16B and core device 16B is sending data to core device 16A. The smart arbiter will first give the bus to one of core devices 16A and 16B according to a predefined arbitration hierarchy. In this example, core device 16B has priority over core device 16A and therefore will be granted access first.

Since the destination device for this request is device 16A, which is operating at the same speed as the bus, the smart arbiter 14 can issue an ENABLE to output buffer 24B in any bus clock cycle and be guaranteed that the data will be latched into latch 30A at the next leading edge of the bus clock so that the data occupies the bus for only one bus clock cycle. Of course, the GRANT to core device 16B must precede the ENABLE. In fact, it must precede a leading edge of the clock of source core device 16B that itself precedes the ENABLE so that the data will be available at the input of output buffer 24B when the ENABLE is issued.

As shown in FIG. 2, the next leading edge of half speed clock 2 of the source device 16B after the request is concurrent with the leading edge of bus clock cycle 3. Accordingly, in the preceding cycle, bus clock cycle 2, the smart arbiter issues a GRANT to core device 16B.

In cycle 3, core 16B starts to assert valid data at the input, PQ2, of tristate buffer 24B. Also in bus clock cycle 3, the smart arbiter 14 enables the tri-state buffer corresponding to source core device 16B. Within the first half of bus clock cycle 3 (which is operating at twice the clock speed of core device 2), the data becomes valid on the bus. In a preferred embodiment of the invention, the enables are half a bus clock cycle and a bus keeper maintains the data for the second half of the corresponding bus cycle, as shown in line BUS.

At the rising edge of the next bus clock cycle, cycle 4, the data is latched at the destination device 16A since the rising edge of its clock corresponds to the rising edge of bus clock cycle 4. Note that core device 16B continuously asserts valid data through bus clock cycles 3 and 4 since the frequency of clock 2 is half that of the bus clock. However, since its tri-state output buffer 24B is enabled only during the first half of clock cycle 3 (and the data is held for the second half of clock cycle 3 by a bus keeper), the output data is driven onto the bus during only cycle 3 and not during cycle 4.

Since core device 16A uses bus clock cycle 4 for receiving the data from core device 16B, that cycle cannot be used for any other purpose relating to core device 16A, even though core device 16A has a request pending.

Accordingly, bus clock cycle 5 is the earliest that the smart arbiter can grant bus access to core device 16A. The next leading edge after bus clock cycle 5 of half speed clock 2 of destination device 16B will correspond to the leading edge of bus clock cycle 7. Accordingly, the data should be placed on the bus during bus clock cycle 6 so that only one bus clock cycle is dedicated to this transaction. Otherwise, the transaction must wait for the bus cycle immediately preceding the next leading edge of the clock of destination device 16B. Because the source device 16A is operating at the same speed as the bus, the data can be made available on the bus by bus cycle 6. Specifically, the smart arbiter issues a GRANT to source core device 16A in cycle 5. The data is available at the input PQ1 of tristate buffer 24A in the next bus clock cycle, cycle 6, since the source core device 16A is operating at bus speed and therefore can make data available in any bus cycle.

In the first half of clock cycle 6, the smart arbiter also issues an ENABLE pulse to tri-state buffer 24A. Accordingly, also during bus clock cycle 6, the data on PQ1 gets placed on the bus 12. That data is held for the second half of clock cycle 6 by the bus keeper. At the next leading edge of clock 28B of destination device 16B (which corresponds to the leading edge of cycle 7 of the bus clock 32), the data is latched at destination core device 16B.

Note that, regardless of the speeds of the transmitting or receiving core devices, data is asserted on the bus for only one bus clock cycle.

Certain variations on the example of FIG. 2 illustrate the flexibility of the invention. In the example of FIG. 2, core device 16A received the data from core device 16B at the rising edge of cycle 4. Accordingly, even though core device 16A had a pending request to transmit data over the bus, core device 16A could not use bus cycle 4 for that transaction since core device 16A was already using cycle 4 to receive data. However, if core device 16B had been transmitting data to some other core device in cycle 3, the smart arbiter 14 could have used cycle 4, rather than cycle 6 for the transaction from device 16A to device 16B. Specifically, it could have issued a GRANT to core device 16A in clock cycle 2 and enabled its tri-state output buffer 24A in cycle 4 such that destination device 16B could have latched the data at the leading edge of bus cycle 5 (which also is concurrent with the leading edge of clock 28B of destination core device 16B) rather than having to wait for bus cycle 6.

Let us consider another variation on FIG. 2. If one or more core devices other than core device 16A or 16B had requested access to the bus at least as early as bus cycle 3 (and the timing of the leading edges of the relevant source and destination core devices was appropriate), the smart arbiter could have granted bus access to one or two of those core device in cycle 2, 3 and/or 4 and enabled the corresponding tri-state output buffer in cycle 4 and/or 5 so that bus cycles 4 and/or 5 could have been used to transmit data.

FIG. 2 and the various modifications thereto discussed above illustrate the increase in efficiency of data transfer of the present invention over a conventional method. With a conventional bus timing method, the bus speed would correspond to that of the slowest core device. Alternately, if the same fast clock speed was used as in the present invention, it would take at least five dedicated bus clock cycles to complete the same two data transfers between core device 16A and core device 16B. None of clock cycles 1 through 5 could be used for any other data transfers.

On the other hand, in accordance with the present invention, only two dedicated bus clock cycles were needed to accomplish the same task while the other three clock cycles could be used by other devices for bus transactions.

The following examples further illustrate the interleaving of bus accesses that can result in overall bus data transfer rates faster than the rates of the individual devices using the bus.

Figure 3:
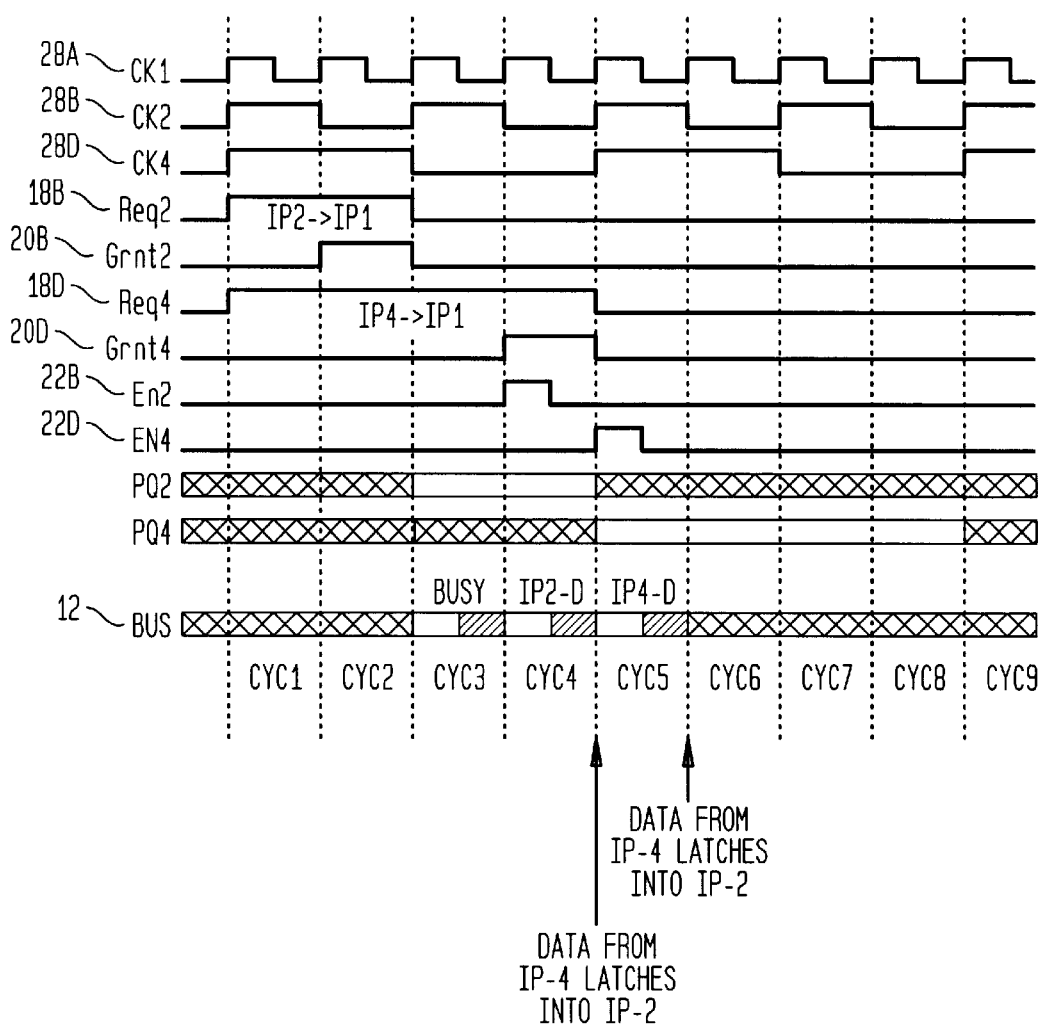
FIG. 3 is a timing diagram illustrating operation of the circuit of FIG. 1 in accordance with the present invention for a second set of bus access request conditions.

FIG. 3 is a timing diagram illustrating another bus timing example. In this example, core devices 16B and 16D simultaneously request access to the bus, both indicating core device 16A as the destination device. As can be seen in the Figure, leading edges of clock 28B of source device 16B occur at bus clock cycles 1, 3, 5, etc, leading edges of clock 28D of source device 16D occur at bus clock cycles 1, 5, 9, etc., and leading edges of clock 28A of destination device 16A occur every bus cycle.

In bus cycle 1, both core devices 16B and 16D send bus requests with destination addresses to the smart arbiter 14. According to a predefined arbitration hierarchy, device 16B is given access first. Since bus cycle 3 corresponds to a leading edge of clock 28B of source device 16B, in cycle 2, the smart arbiter 14 issues a GRANT to core device 16B. Accordingly, in bus cycle 3, data is asserted at the input PQ2 of tristate buffer 24B. Since clock 28A of destination device 16A is operating at the same rate as the bus clock 32, it can latch the data in any bus clock cycle. However, in cycle 3, another core device 16 other than device 16B or 16D is using the bus 12. Therefore, the smart arbiter 14 does not issue the enable pulse in cycle 3 and core device 16B drives no data onto the bus during cycle 3. In cycle 4, the bus 12 is free. Therefore, the smart arbiter 14 enables tri-state output buffer 24B of core device 16B in bus cycle 4 and the data from core device 16B is asserted on the bus for half of bus cycle 4 and maintained by a bus keeper for the second half of bus cycle 4. The data will be latched into input buffer 30A of destination device 16A at the rising edge of bus cycle 5.

The request from core device 16D is still pending. The next rising edge of clock 28D of source device 16D is in bus cycle 5. In fact, the rising edge of clock 28D that occurs in clock cycle 5 is still the first rising edge thereof since the request was issued. Accordingly, also in bus cycle 4, the smart arbiter 14 issues a GRANT to core device 16D. Note that, the arbiter could actually issue this GRANT in any of bus cycles 2, 3, or 4. Since the destination device is core device 16A which is operating at the same speed as the bus clock 32, the data output out to the bus by core device 16B is latched into core device 16A at the rising edge of clock cycle 5.

Since the destination device 16A is operating at the bus clock rate and can latch data on any bus cycle, in bus cycle 5, the smart arbiter 14 enables the tri-state output buffer 24D of source device 16D. Accordingly, during bus clock cycle 5, the data from core device 16D is driven onto the bus 12. The data is latched into core device 16A at the rising edge of bus clock cycle 6 (which is also the rising edge of the clock 28A corresponding to core device 16A).

Despite the fact that source device 16D operates at one-quarter the bus clock speed and core device 16B operates at one-half the bus clock speed, both transactions plus a third are completed within 5 bus clock cycles using only 3 of the cycles.

With a conventional bus arbitration scheme, the two data transfers from core device 16B to core device 16A and from core device 16D to core device 16A would take at least three cycles of clock 4, including bus turnaround time. That is the equivalent of twelve bus clock cycles of the present invention. Thus, in this particular case, the present invention improves the data bandwidth on the bus by a factor of 6.

Figure 4:
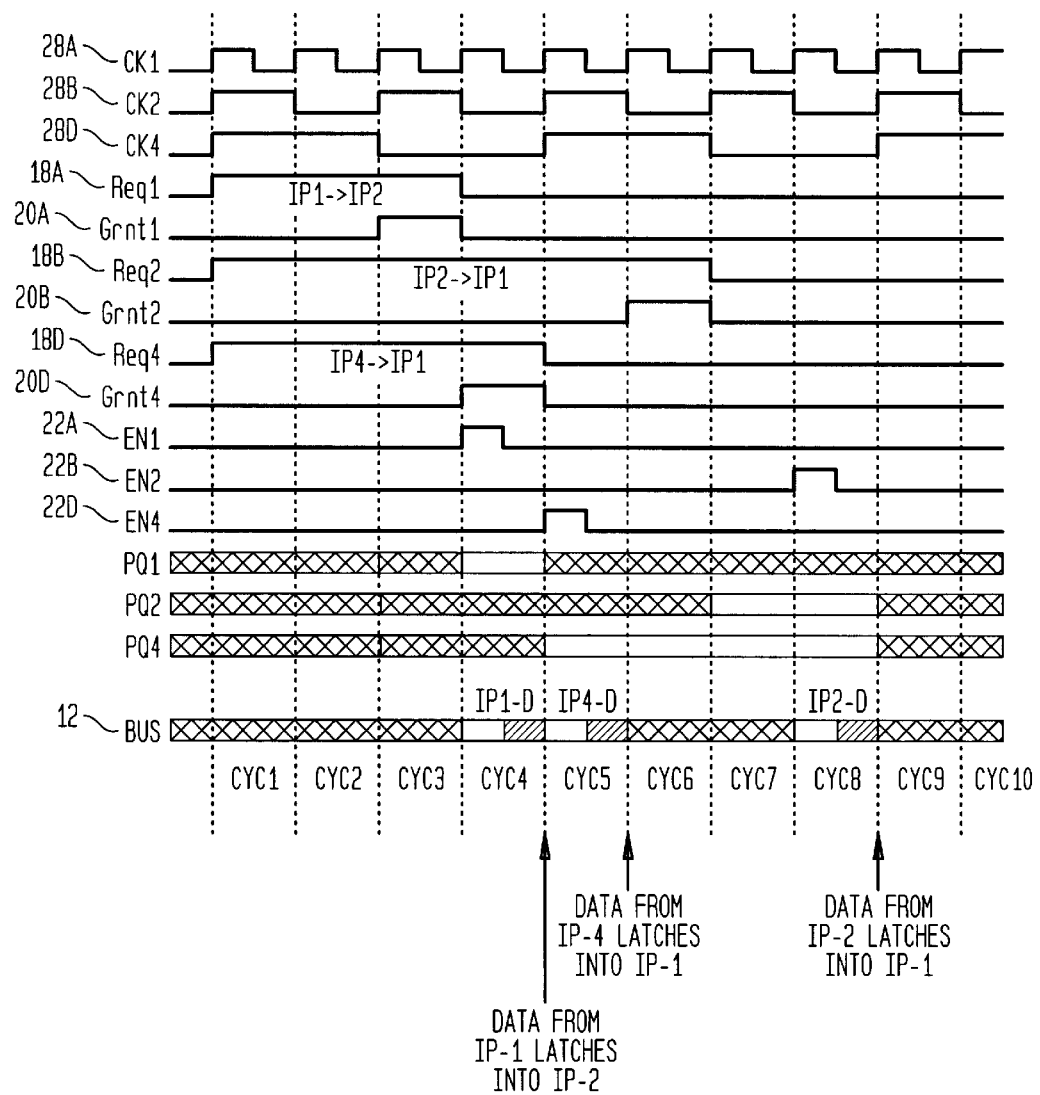
FIG. 4 is a timing diagram illustrating operation of the circuit of FIG. 1 in accordance with the present invention for a third set of bus access request conditions.

FIG. 4 is a timing diagram illustrating three data transfers over the bus involving core devices 16A, 16B, and 16D again. The transfers are a transfer from core device 16A to core device 16D, a transfer from core device 16B to core device 16A and a transfer from core device 16D to core device 16A. In bus clock cycle 1, each of core devices 16A, 16B, and 16D requests access to the bus. Let us assume that the predetermined bus access hierarchy dictates that access will first be given to core device 16A, then to core device 16D, and then to core 16B. Accordingly, the request from core 16A is granted first.

Since the destination device 16B cannot latch the data in bus cycle 4 (and the leading edge of bus cycle 3 is too early to assert the data), bus cycle 5 is the earliest the data can be latched at the destination device 16B. Therefore, there is no reason to generate data from core device 16A intended for core device 16B before bus cycle 4. Thus, while the smart arbiter can issue a GRANT to core device 16A in bus cycle 2, and enable it in bus cycle 4, it would not be any faster than issuing a GRANT in bus cycle 3 and enabling core device 16A in bus cycle 4. Accordingly, the GRANT to core device 16A is delayed until bus cycle 3 and the ENABLE of the tri-state output buffer 24A of core device 16A issues in the first half of bus cycle 4. In bus cycle 4, the data from core device 16A is placed on the bus. At the rising edge of bus cycle 5, the data is latched into the destination device 16B.

Meanwhile, core device 16D, which is next in line to use the bus in accordance with the aforementioned hierarchy, wants to send data to destination core device 16A. Since core device 16A operates at the bus clock speed, data can be latched into the destination core device 16A at the leading edge of any bus clock cycle. The next leading edge of clock 28D of source device 16D is at bus cycle 5. In fact, it is the first leading edge of clock 4 after the request was issued. Thus, the very next bus cycle, cycle 5, is dedicated to the transaction from core device 16D to core device 16A. This means that, in cycle 4, while the data from device 16A is on the bus, the smart arbiter issues a GRANT to core device 16D so that the data becomes available on PQ4 during bus clock cycle 5. Then, in the first half of cycle 5, the smart arbiter 14 ENABLES the tri-state buffer 24D of core device 16D. The data is latched at destination device 16A at the rising edge of the next bus clock cycle, cycle 6.

The request from device 16B is still pending. Next, in bus cycle 6, the smart arbiter grants access to core device 16B since the next leading edge of clock 28B of device 16B corresponds to bus cycle 7. Note that the GRANT to device 16B could actually have been issued in any of bus clock cycles 2 through 6 without having any effect on bus operation. Since the destination device is device 16A which can latch bus data in any bus cycle, the smart arbiter can issue an ENABLE to tristate buffer 16B in any bus cycle and be assured that it will be latched at the end of that cycle. Accordingly, the smart arbiter could issue the ENABLE in bus cycle 7. However, to illustrate the flexibility of the present invention, it waits until bus cycle 8 in this example. The data is latched into input latch 30A at the leading edge of the next bus clock cycle such that only one dedicated bus cycle is used for the transaction.

Figure 5:
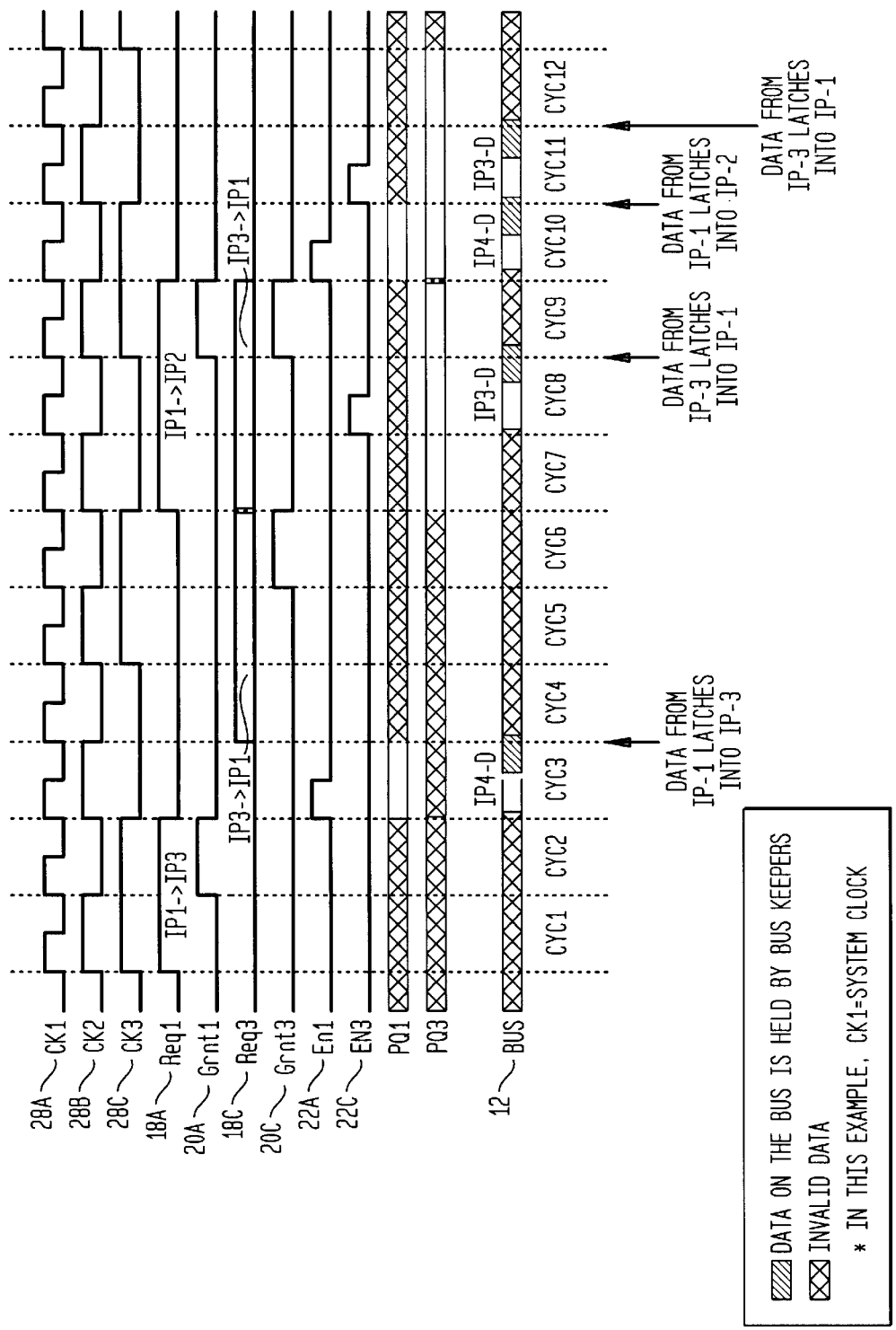
FIG. 5 is a timing diagram illustrating operation of the circuit of FIG. 1 in accordance with the present invention for a fourth set of bus access request conditions.

Finally, FIG. 5 is a timing diagram illustrating timing in accordance with the present invention where the clock speeds of the various core devices are not integer multiples of each other. In this example, two devices are vying for bus access, namely, core device 16A and core device 16C. As in all previous examples, core device 16A operates on clock 28A which is equal to the bus clock speed and core device 16B, which is only a destination device in this particular example, operates at one-half the bus clock speed. Core device 16C operates on clock 28C which runs at one-third the bus clock speed.

As an example, let us assume that core device 16A is a processor seeking data from core device 16C which is an SDRAM. Accordingly, in bus cycle 1 it sends a memory read request to the SDRAM 16C over the bus. SDRAM 16C responds with two memory words back to processor 16A. Finally, in clock cycle 7 processor 16A starts to request access to the bus again in order to transfer data to core device 16B, which might be another microprocessor or a micro controller. Accordingly, in bus clock cycle 1, processor 16A issues a request for bus access. In bus clock cycle 2, the smart arbiter 14 grants access to processor 16A. The smart arbiter 14 knows that the next leading edge of clock 28C of destination SDRAM 16C is simultaneous with the leading edge of bus cycle 4. Therefore, in bus clock cycle 3, it enables the tri-state output buffer 24A of processor 16A. Accordingly, also during bus clock cycle 3, output buffer 24A outputs the data on the bus 12 for half of bus cycle 3 and the data is held on the bus for the second half of clock cycle 3 by a bus keeper.

As noted, the next leading edge of clock 28C of destination SDRAM 16C corresponds to the leading edge of bus clock cycle 4. Accordingly, the data is latched into destination SDRAM 16C at the leading edge of bus clock cycle 4.

Therefore, starting with bus clock cycle 4, SDRAM 16C requests access to the bus. Accordingly, in cycle 4, it requests access to the bus. Since the next leading edge after cycle 4 of clock 28C of SDRAM 16C occurs in bus clock cycle 7, the smart arbiter should issue a GRANT to SDRAM 16C before bus cycle 7, i.e., in either bus clock cycle 5 or bus cycle 6. In this particular example, it does so in bus cycle 6. Accordingly, in bus cycle 7, SDRAM 16C starts outputting data to its tri-state buffer 24C on line PQ3. Since the destination device 16A operates at the bus speed, the tri-state buffer 24C, is ENABLED immediately in bus cycle 8, at which point the data becomes valid on the bus. Input buffer 30A of processor 16A latches the data at the leading edge of the next bus clock cycle, cycle 9.

In the meantime, starting with bus cycle 7, processor 16A has issued a new request for access to the bus in order to transfer data to micro controller 16B and SDRAM 16C also has requested access in order to send the second word of data back to microprocessor 16A. According to a predetermined bus access hierarchy, processor 16A has priority over SDRAM 16C.

The smart arbiter 14 knows the identity of the destination device corresponding to the request from processor 16A and knows that destination micro controller 16B can latch data at the beginning of bus cycles 9, 11, 13, etc. However, bus cycle 9 is too early because it requires at least two bus clock cycles from clock cycle 7 to enable the tri-state buffer 24A of processor 16A. Particularly, at the fastest, the request is received in cycle 7, a GRANT can be issued in bus cycle 8 and the enable to tri-state buffer 24A of processor 16A can be issued in clock cycle 9 which is too late for it to be latched at the input buffer 30B of destination micro controller 16B by the leading edge of bus cycle 9. The leading edge of bus cycle 11 is the earliest that the data transfer from processor 16A to micro controller 16B. Accordingly, the smart arbiter 14 can issue a GRANT to tot processor 16A in bus cycle 8 or 9 and ENABLE output buffer 24A in bus cycle 10. In this particular example, the GRANT is issued in bus cycle 9, the ENABLE follows in bus cycle 10, the data from core device 1 becomes valid on the bus during clock cycle 10 and is latched into input buffer 30B of micro controller 16B at the leading edge of bus cycle 11.

Meanwhile, the request from SDRAM 16C is still pending. SDRAM 16C cannot put data on the bus before the preceding transaction is completed at the leading edge of bus cycle 11. Because destination processor 16A uses clock 28A, the data can be put on the bus in bus cycle 11 and latched at the leading edge of bus cycle 12, if allowable relative to the timing of the source device, SDRAM 16C. The next leading edge of clock 28C of SDRAM 16C is in bus cycle 10. Thus, response to the request that started on bus cycle 7, smart arbiter 14 can issue a timely GRANT to SDRAM 16C in bus cycle 8 or 9. Smart arbiter 14 then waits until bus cycle 11 to ENABLE output buffer 24C. The data is, therefore, put on the bus in bus cycle 11 and latched into destination input buffer 30A at the leading edge of bus cycle 12.

With a conventional bus, the operation illustrated in FIG. 5 would require that the bus be occupied for a minimum of six bus clock cycles (two cycles of clock 3) in order to complete the two data block transfers from SDRAM 16C to microprocessor 16A. With the present invention, the operation occupies the bus for only two dedicated bus cycles and it allows the bus to be used to transfer data between other core devices in between. Likewise, if other bus requests from other core devices were pending, cycles 4, 5, 6, 7, and 9 might have been able to be used for additional bus data transactions. That would not be possible with a conventional bus.

In accordance with the invention, any data transfer over the bus is completed with one dedicated bus clock cycle regardless of the clock speed of the core devices involved. With conventional buses, either the slower core devices utilize multiple dedicated bus clock cycles to transfer data or the bus simply operates at the clock rate of the slowest core device.

The present invention can achieve increases in bus bandwidth relative to prior art bus schemes by a factor of N, where:

$$N = \frac{\text{(clock rate of the fastest IP block utilizing the bus)}}{\text{(clock rate of the slowest IP block utilizing the bus)}}.$$

As can be seen from the discussion of FIG. 3, for instance, short term increases in speed can exceed even this ratio, however, the average rate over extended periods of time generally will not exceed N as defined above.

As illustrated in FIG. 5, the invention inherently supports split transactions on the bus, where the cycle delay from the assertion of address and request to the data transfer could be very long and where data returned in response to requests may be different from the order of the request (addresses) to which they are responsive.

Also, it is possible to advantageously provide a bus clock rate even faster than the fastest core device. For instance consider the example of a SoC integrated circuit on which there are four core devices, all of which operate at the same speed, x. In accordance with the present invention, a bus clock speed of 4x can be utilized (assuming the previously discussed timing requirements of the invention can be met)

and the phases of the clocks of the four core devices can be staggered relative to each other by ¼ cycle. In such a scheme, it would be possible to conduct transactions on the bus four times faster than any core device.

While the invention has been described above in connection with a system-on-a-chip integrated circuit because the busses on such a chip are likely to easily meet all timing requirements of the present invention, the invention can be applied to any bus that is short enough that data can be validly asserted on the bus within a half of a bus clock cycle from the time the output buffer is enabled.

Further, the present invention does not require any modification of core devices to accommodate the inventive bus. Particularly, in accordance with the invention, bus access by any of the core devices is controlled by the enable signals generated by the smart arbiter. Thus, the invention supports any bus protocol utilized by any of the core devices. This is particularly advantageous with respect to system-on-a-chip integrated circuits where it is frequently the case that one or more of the core devices is a proprietary design of an entity other than the manufacturer of the integrated circuit. Thus, the manufacturer of the SoC integrated circuit may not have any knowledge of or at least any ability to redesign the core devices.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

We claim:

1. A method of conducting data transactions over a bus to which a plurality of source devices and destination devices are coupled, said source devices and destination devices operating on clocks of varying rates, said method comprising the steps of:

receiving a request for access to said bus from a source device during a cycle of a bus clock, said request including information identifying the intended destination device;

responsive to said request, issuing a first control signal that instructs said source device to place data corresponding to said request at the input of a buffer coupled between said source device and said bus; and in a bus clock cycle subsequent to issuance of said first control signal, issuing a second control signal to said buffer that instructs said buffer to output said data onto said bus;

wherein said second control signal is issued in a bus clock cycle that precedes a leading edge of a clock corresponding to said intended destination device by no more than one cycle of said bus clock such that said data occupies said bus for only one bus clock cycle.

2. The method as set forth in claim 1 wherein said bus clock has a rate at least as fast as a rate of a fastest one of said clocks corresponding to said plurality of source and destination devices.

3. The method as set forth in claim 1 wherein said first control signal is issued at least one bus clock cycle before a leading edge of a clock corresponding to said source device that precedes said leading edge of said intended destination device.

4. The method as set forth in claim 3 wherein said bus clock has cycles comprising first and second phases and operates at a rate that guarantees that a delay period between issuance of said first control signal and corresponding data becoming valid on said bus is less than or equal to a duration of said first phase of said bus clock cycle.

5. The method as set forth in claim 4 wherein said bus clock has cycles comprising only said first and second clock phases and has a duty cycle of 50%.

6. The method as set forth in claim 4 wherein requests for access to said bus that are received during the same bus clock cycle are granted according to a predetermined hierarchy.

7. The method as set forth in claim 4 wherein said second control signal has a duration equal to said first phase of said bus clock cycle and said method further comprises the step of holding data placed on said bus responsive to said second control signal with a bus keeper for a duration of said second phase of said bus clock cycle.

8. The method as set forth in claim 4 wherein said buffer of said source device is a tristate buffer and wherein said second control signal enables said buffer.

9. The method as set forth in claim 8 further comprising an input buffer coupled between each destination device and said bus and wherein said input buffer latches data on said bus that is intended for its corresponding destination device responsive to a leading edge of the clock corresponding to said destination device.

10. The method as set forth in claim 9 further comprising the step of:

responsive to receipt of said request for access to said bus, determining the rate and phase of the clock corresponding to said source device and the rate and phase of the clock corresponding to said intended destination device.

11. The method as set forth in claim 10 wherein said step of determining clock rates comprises storing data indicative of the clock rate and phase of said clocks corresponding to each of said source and destination devices coupled to said bus in a look up table.

12. The method as set forth in claim 10 further comprising the step of interspersing said first and second control signals issued to multiple source devices having simultaneously pending requests for access to said bus such that a bandwidth of data transactions over said bus is greater than the bandwidth of at least some of the source and destination devices.

13. The method as set forth in claim 4 wherein said bus is embodied on a system-on-a-chip integrated circuit.

14. A bus arbiter for arbitrating access to a bus among a plurality of source devices and destination devices coupled to conduct data transactions over said bus by issuing requests for access to said bus, said source devices and destination devices operating on clocks of varying rates, said apparatus comprising:

means for receiving a request for access to said bus from source devices during a cycle of said bus clock, said request including information identifying the intended destination device;

means for generating, responsive to said request, a first control signal that instructs said source device to place data corresponding to said request at the input of an output buffer coupled between said source device and said bus; and means for generating, in a bus clock cycle subsequent to generation of said first control signal, a second control signal that controls said output buffer to output said data onto said bus;

wherein said second control signal is issued in a bus clock cycle that precedes a leading edge of a clock corresponding to said intended destination device by no more than one cycle of said bus clock such that said data occupies said bus for only one bus clock cycle.

15. The bus arbiter as set forth in claim 14 wherein said bus arbiter is clocked by said bus clock.

16. The bus arbiter as set forth in claim 15 wherein said bus clock has a rate at least as fast as a rate of a fastest one of said clocks corresponding to said plurality of source and destination devices.

17. The bus arbiter as set forth in claim 15 wherein said means for generating said first control signal generates said first control signal at least one bus clock cycle before a leading edge of a clock corresponding to said source device that precedes said leading edge of said intended destination device.

18. The bus arbiter as set forth in claim 17 wherein said bus clock has cycles comprising first and second phases and operates at a rate that guarantees that a delay period between issuance of said first control signal and corresponding data becoming valid on said bus is less than or equal to a duration of said first phase of said bus clock cycle.

19. The bus arbiter as set forth in claim 18 wherein said bus clock has cycles comprising only said first and second clock phases and has a duty cycle of 50%.

20. The bus arbiter as set forth in claim 18 further comprising means for granting access to the bus when multiple requests are received during the same bus clock cycle according to a predetermined hierarchy.

21. The bus arbiter as set forth in claim 18 wherein said second control signal has a duration equal to said first phase of said bus clock cycle and said apparatus further comprises a bus keeper for holding data placed on said bus responsive to said second control signal for a duration of said second phase of said bus clock cycle.

22. The bus arbiter as set forth in claim 18 further comprising:

means, responsive to receipt of said request for access to said bus, for determining the rate and phase of the clock corresponding to said source device and rate and phase of the clock corresponding to said intended destination device.

23. The bus arbiter as set forth in claim 22 wherein said means for determining clock rates comprises a memory storing data indicative of the clock rate and phase of said clocks corresponding to each of said source and destination devices coupled to said bus in a look up table.

24. The bus arbiter as set forth in claim 22 further comprising means for interspersing said first and second control signals issued to multiple source devices having simultaneously pending requests for access to said bus such that a bandwidth of data transactions over said bus is greater than the bandwidth of at least some of the source and destination devices.

25. The bus arbiter as set forth in claim 22 wherein said bus is a bus on a system-on-a-chip integrated circuit.

26. A circuit comprising:

a bus;

a bus clock;

a plurality of source devices coupled to transmit data via said bus, said source devices issuing requests for access to said bus for bus data transactions, said requests including an identification of a destination for said data;

an output buffer corresponding to each source device, said output buffers each having an input coupled to said corresponding source device and an output coupled to said bus;

a plurality of destination devices coupled to receive data via said bus;

a plurality of device clocks of different rates for clocking said source and said destination devices; and a bus arbiter coupled to receive said requests and, responsive thereto, generate a first control signal that instructs a requesting source device to place data at the input of said corresponding output buffer and generate, in a bus clock cycle subsequent to generation of said first control signal, a second control signal that controls said corresponding output buffer to output said data onto said bus;

wherein said second control signal is issued in a bus clock cycle that precedes a leading edge of a clock corresponding to said intended destination device by no more than one cycle of said bus clock such that said data occupies said bus for only one bus clock cycle.

27. The circuit as set forth in claim 26 wherein said bus arbiter is clocked by said bus clock.

28. The circuit as set forth in claim 26 wherein said bus arbiter issues said first control signal at least one bus clock cycle before a leading edge of a clock corresponding to said source device that precedes said leading edge of said intended destination device.

29. The circuit as set forth in claim 28 wherein said bus clock has cycles comprising first and second phases and operates at a rate that guarantees that a delay period between issuance of said first control signal and corresponding data becoming valid on said bus is less than or equal to a duration of said first phase of said bus clock cycle.

30. The circuit as set forth in claim 29 wherein said bus clock has cycles comprising only said first and second clock phases and has a duty cycle of 50%.

31. The circuit as set forth in claim 29 wherein said bus arbiter grants requests for access to said bus when multiple requests are received during the same bus clock cycle according to a predetermined hierarchy.

32. The circuit as set forth in claim 29 wherein said second control signal has a duration equal to said first phase of said bus clock cycle further comprising:

a bus keeper that holds data that is placed on said bus during said first phase of said bus clock for a duration of said second phase of said bus clock cycle.

33. The circuit as set forth in claim 29 wherein said output buffers are tristate buffers and wherein said second control signal enables said buffer.

34. The circuit as set forth in claim 33 further comprising:

an input buffer coupled between each destination device and said bus; and wherein said input buffer latches data on said bus that is intended for its corresponding destination device responsive to a leading edge of the clock corresponding to said destination device.

35. The circuit as set forth in claim 34 wherein said bus arbiter determines the rate and phase of the clock corresponding to said source device and the rate and phase of the clock corresponding to said intended destination device responsive to receipt of each request for access to said bus.

36. The circuit as set forth in claim 35 wherein said means for determining clock rates comprises a memory storing data indicative of the clock rate and phase of said clocks corresponding to each of said source and destination devices coupled to said bus in a look up table.

37. The bus arbiter as set forth in claim 35 wherein said bus arbiter intersperses said first and second control signals issued to multiple source devices having simultaneously pending requests such that a bandwidth of data transactions over said bus is greater than the bandwidth of at least some of the source and destination devices.

38. The circuit as set forth in claim 35 wherein said circuit is an integrated circuit.

39. The circuit as set forth in claim 38 wherein said circuit is a system-on-a-chip integrated circuit.

40. The circuit as set forth in claim 29 wherein said circuit is a system-on-a-chip integrated circuit.

41. A bus arbiter for arbitrating access to a bus among a plurality of source devices and destination devices coupled to conduct data transactions over said bus by issuing requests for access to said bus, said source and destination devices operating on clocks of varying rates, each of said source devices having a buffer coupled between it and said bus, said bus arbiter having information as to the rates and phases of said clocks of said source and destination devices and issuing bus grants and enabling the corresponding output buffers at times based on said clock rate and phase in order to utilize only a single dedicated bus cycle per transaction.

42. The bus arbiter as set forth in claim 41 wherein said bus arbiter is clocked by a bus clock having a rate at least as fast as a rate of a fastest one of said clocks corresponding to said plurality of source and destination devices.

43. The bus arbiter as set forth in claim 41 wherein said requests for access to said bus include data identifying an intended destination device and said bus arbiter grants bus access to a source device at least one bus clock cycle before a leading edge of a clock corresponding to said source device that precedes said leading edge of said intended destination device.

44. The bus arbiter as set forth in claim 43 wherein said bus clock has cycles comprising first and second phases and operates at a rate that guarantees that a delay period between issuance of a grant of access to said bus and corresponding data becoming valid on said bus is less than or equal to a duration of said first phase of said bus clock cycle.

45. The bus arbiter as set forth in claim 44 wherein said bus arbiter comprises a memory storing data indicative of the rate and phase of said clocks corresponding to said source and destination devices.

46. The bus arbiter as set forth in claim 44 wherein said bus arbiter, when there are simultaneously pending requests for access to said bus, intersperses the granting of bus access to source devices and the issuance of enables to said corresponding output buffers such that a bandwidth of data transactions over said bus is greater than the bandwidth of at least some of the source and destination devices.

47. The bus arbiter as set forth in claim 44 wherein said bus is a bus on a system-on-a-chip integrated circuit.

48. A method of conducting data transactions over a bus to which a plurality of source devices and destination devices are coupled, said source and destination devices operating on clocks of varying rates, and said source devices having an output buffer coupled between it and said bus, said method comprising the steps of:

maintaining information indicative of the rates and phases of said clocks of said source and destination devices; and issuing bus grants to source devices and enabling the corresponding output buffers at times based on said information in order to utilize only a single dedicated bus cycle per data transaction.

49. The method as set forth in claim 48 wherein a bus grant is issued to a source device at least one bus clock cycle before a leading edge of a clock corresponding to said source device that precedes a leading edge of a clock of the destination device to which said source device is sending data.

50. The method as set forth in claim 49 wherein data transactions over said bus are clocked by a bus clock, said bus clock having cycles comprising first and second phases and operating at a rate that guarantees that a delay period between granting of access to said bus and corresponding data becoming valid on said bus is less than or equal to a duration of said first phase of said bus clock cycle.

51. The method as set forth in claim 50 wherein said maintaining step comprises storing data indicative of the rate and phase of said clocks corresponding to each of said source and destination devices in a look up table.

52. The method as set forth in claim 50 wherein said bus is embodied on a system-on-a-chip integrated circuit.

* * * * *